United States Patent
Ishii et al.

(10) Patent No.: US 10,690,238 B2
(45) Date of Patent: Jun. 23, 2020

(54) DEVICE FOR CONTROLLING VEHICULAR VARIATOR

(71) Applicants: JATCO Ltd, Fuji-shi, Shizuoka (JP); NISSAN MOTOR CO., LTD., Yokohama-shi, Kanagawa (JP)

(72) Inventors: Yasunori Ishii, Yamato (JP); Tetsuya Izumi, Ayase (JP); Sungpil Ryu, Seoul (KR); Hiroki Iwasa, Atsugi (JP); Hironori Miyaishi, Sagamihara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 248 days.

(21) Appl. No.: 15/755,001

(22) PCT Filed: Sep. 6, 2016

(86) PCT No.: PCT/JP2016/076065
§ 371 (c)(1),
(2) Date: Feb. 23, 2018

(87) PCT Pub. No.: WO2017/043457
PCT Pub. Date: Mar. 16, 2017

(65) Prior Publication Data
US 2020/0025288 A1 Jan. 23, 2020

(30) Foreign Application Priority Data
Sep. 9, 2015 (JP) .................................. 2015-177960

(51) Int. Cl.
*F16H 61/02* (2006.01)
*F16H 61/12* (2010.01)
(Continued)

(52) U.S. Cl.
CPC ............. *F16H 61/02* (2013.01); *F16H 61/12* (2013.01); *F16H 61/662* (2013.01); *F16H 63/50* (2013.01);
(Continued)

(58) Field of Classification Search
CPC ...... F16H 61/02; F16H 61/0202; F16H 61/12; F16H 61/662; F16H 2061/1232;
(Continued)

(56) References Cited

U.S. PATENT DOCUMENTS 8,926,468 B2 * 1/2015 Versteyhe ............. F16H 15/503
475/207
2008/0227595 A1 * 9/2008 Pfister ............... F16H 61/66259
477/48
(Continued)

FOREIGN PATENT DOCUMENTS

GB 2 301 871 A 12/1996
JP H03-118235 A 5/1991
(Continued)

*Primary Examiner* — Edwin A Young
(74) *Attorney, Agent, or Firm* — Foley & Lardner LLP (57) ABSTRACT

Provided are a variator and a transmission controller in an engine-driven vehicle. The transmission controller has an instantaneous interruption recovery control portion configured to, upon a power reset from an instantaneous interruption during running, set a target through transmission ratio and a desired through transmission ratio to a lowest transmission ratio value by initialization and perform recovery control to recover an actual through transmission ratio of the variator to a transmission ratio value for shifting to normal control. The instantaneous interruption recovery control portion is further configured to, upon the power reset from the instantaneous interruption during the running, set a change speed of the target through transmission ratio from the lowest transmission ratio value to the desired through transmission ratio, to be higher than that under the normal
(Continued)

control, before a time at which the desired through transmission ratio value deviates from the lowest transmission ratio value.

6 Claims, 5 Drawing Sheets

(51) Int. Cl.
    *F16H 61/662*     (2006.01)
    *F16H 63/50*     (2006.01)

(52) U.S. Cl.
    CPC ............... *F16H 2061/1228* (2013.01); *F16H 2061/1292* (2013.01); *F16H 2061/66204* (2013.01)

(58) Field of Classification Search
    CPC ..... F16H 2061/1248; F16H 2061/1292; F16H 2061/66204
    See application file for complete search history.

(56) References Cited

U.S. PATENT DOCUMENTS

| | | | | |
|---|---|---|---|---|
| 2012/0028749 | A1* | 2/2012 | Kawasaki | B60K 6/48 |
| | | | | 475/211 |
| 2012/0157254 | A1* | 6/2012 | Aitzetmueller | F16H 47/04 |
| | | | | 475/31 |

FOREIGN PATENT DOCUMENTS

| | | |
|---|---|---|
| JP | H11-82707 A | 3/1999 |
| JP | H11-351378 A | 12/1999 |

* cited by examiner

DEVICE FOR CONTROLLING VEHICULAR VARIATOR

TECHNICAL FIELD

The present invention relates to a device for controlling a vehicular variator (such as a continuously variable transmission mechanism) which is arranged between a running drive source and drive wheels.

BACKGROUND ART

There is conventionally known a technique for controlling a continuously variable transmission of the type having a variator and a clutch arranged in series with the variator, wherein the clutch is set to a neutral position upon recovery (power reset) from the occurrence of an instantaneous interruption in a control system during running. By this control, a change in operating state due to the power reset is suppressed from being transmitted to drive wheels (see, for example, Patent Document 1).

However, the above conventional technique still has the following problem even though it is possible by the conventional technique to suppress a change in vehicle behavior before and after the occurrence of the instantaneous interruption in the control system.

When power is reset during running, the vehicle speed sensor value is set to zero on the assumption that an ignition switch is turned on during parking. Then, both of the desired transmission ratio and the target transmission ratio of the variator are set to a lowest transmission ratio value by initialization processing. At this time, the actual transmission ratio of the variator is not equal to the lowest transmission ratio value and is in the vicinity of a transmission ratio value at the occurrence of the instantaneous interruption. The desired transmission ratio is thus changed, immediately after the power reset, to the vicinity of the transmission ratio value at the occurrence of the instantaneous interruption. On the other hand, the target transmission ratio is set to the lowest transmission ratio value. Consequently, the variator starts to downshift from the vicinity of the transmission ratio value at the occurrence of the instantaneous interruption to the lowest transmission ratio value so as to adjust the actual transmission ratio to the target transmission ratio.

It however takes a long time to converge the target transmission ratio to the desired transmission ratio, which is determined according to vehicle running conditions, in the case where the target transmission ratio is changed from the lowest transmission ratio value to the desired transmission ratio at the same speed as under normal control. Namely, the time during which the target transmission ratio is lower than the desired transmission ratio is long. This results in a problem that the rotation speed of the engine may become unnecessarily high due to a long duration of the downshift in which in which the input rotation speed of the transmission is set high.

PRIOR ART DOCUMENTS

Patent Documents

Patent Document 1: Japanese Laid-Open Patent Publication No. H11-082707

SUMMARY OF THE INVENTION

The present invention has been made in view of the above problem. It is an object of the present invention to provide a device for controlling a vehicular variator such that, when power is reset from an instantaneous interruption during running, rotation of a running drive source is prevented from being unnecessarily increased.

To achieve the above object, the present invention provides a vehicular variator control device for controlling a variator of a vehicle. The variator is arranged between a running drive source and drive wheels to continuously vary a transmission ratio. The control device has a shift control unit configured to control an actual transmission ratio of the variator to a target transmission ratio. The shift control unit includes a desired transmission ratio setting portion configured to set a desired transmission ratio of the variator according to at least one of a driver's operating action and a running state of the vehicle; and a target transmission ratio setting portion configured to set the target transmission ratio so as to change the actual transmission ratio of the variator to the desired transmission ratio at a given shift speed. The vehicular variator control device according to the present invention is characterized in that: the shift control unit further includes an instantaneous interruption recovery control portion configured to, upon a power reset from an instantaneous interruption during running, set the target transmission ratio and the desired transmission ration to a lowest transmission ratio value by initialization and perform recovery control to recover the actual transmission ratio of the variator to a transmission ratio value for shifting to normal control; and the instantaneous interruption recovery control portion is further configured to, upon the power reset from the instantaneous interruption during the running, set a change speed of the target transmission ratio from the lowest transmission ratio value to the desired transmission ratio, to be higher than that during the normal control, before a time at which the desired transmission ratio deviates from the lowest transmission ratio value.

When power is reset from an instantaneous interruption during running, a speed of change of the target transmission ratio from the lowest transmission ratio value to the desired transmission ratio is set higher than that under the normal control before the time the desired transmission ratio deviates from the lowest transmission ratio value.

During a short time before and after the instantaneous interruption, there is no sudden change in the actual transmission ratio. The actual transmission ratio at the power reset is in the vicinity of the transmission ratio value for shifting to the normal control so that the amount of change of the actual transmission ratio is small. However, the target transmission ratio is set to the lowest transmission ratio value by initialization from the instantaneous interruption so that the amount of change of the target transmission ratio from the lowest transmission ratio value to the desired transmission ratio is large.

Upon the power reset from the instantaneous interruption during the running, the change speed of the target transmission ratio is set higher than that under the normal control as mentioned above. Thus, the time required to converge the target transmission ratio to the desired transmission ratio after the power reset is shortened as compared with the case where the target transmission ratio is changed at the same slow speed as under the normal control. This provides the effect that, when the power reset is generated from the instantaneous interruption during the running, the rotation of the running drive source is prevented from becoming unnecessarily high due to downshift of the variator.

It is therefore possible to, when the power is reset from the instantaneous interruption during the running, prevent the rotation of the running drive source from becoming unnecessarily high.

DETAILED DESCRIPTION OF THE EMBODIMENTS

As the best mode for carrying out the present invention, a vehicular variator control device according to Embodiment 1 will be described below with reference to the drawings.

Embodiment 1

The configurations of the vehicular variator control device will be first explained below.

The control device of Embodiment 1 is designed for use in an engine-driven vehicle having mounted thereon a continuously variable transmission with a sub-transmission mechanism. Hereinafter, the configurations of the vehicular variator control device of Embodiment 1 will be explained below under the headings of "Overall System Configuration", "Configuration for Shift Control Based on Shift Map" and "Instantaneous Interruption Recovery Control Process".

[Overall System Configuration]

Figure 1:
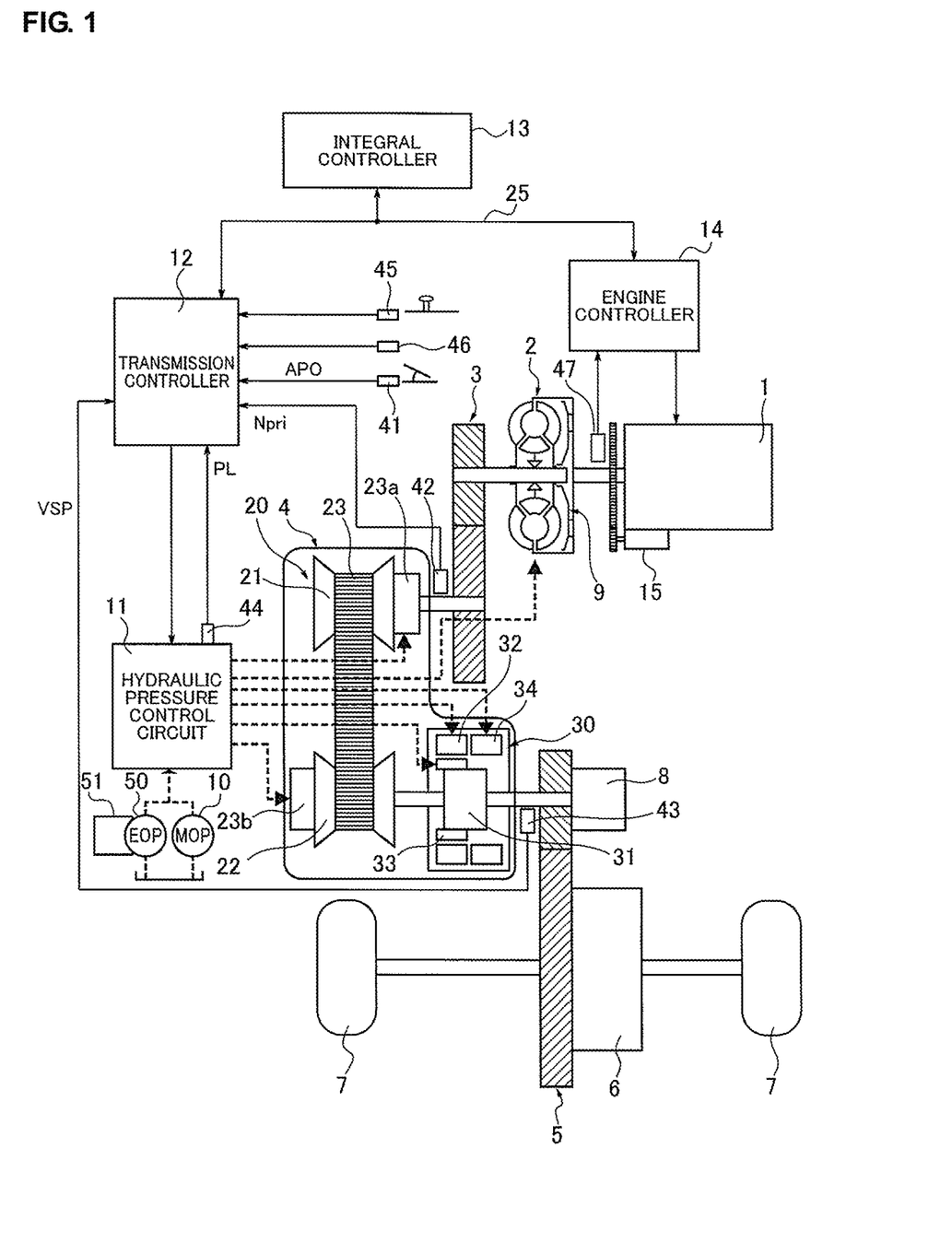
FIG. 1 is an overall configuration diagram of an engine-driven vehicle having mounted thereon a continuously variable transmission with a sub-transmission mechanism, to which a control device according to Embodiment 1 is applied.
Figure 2:
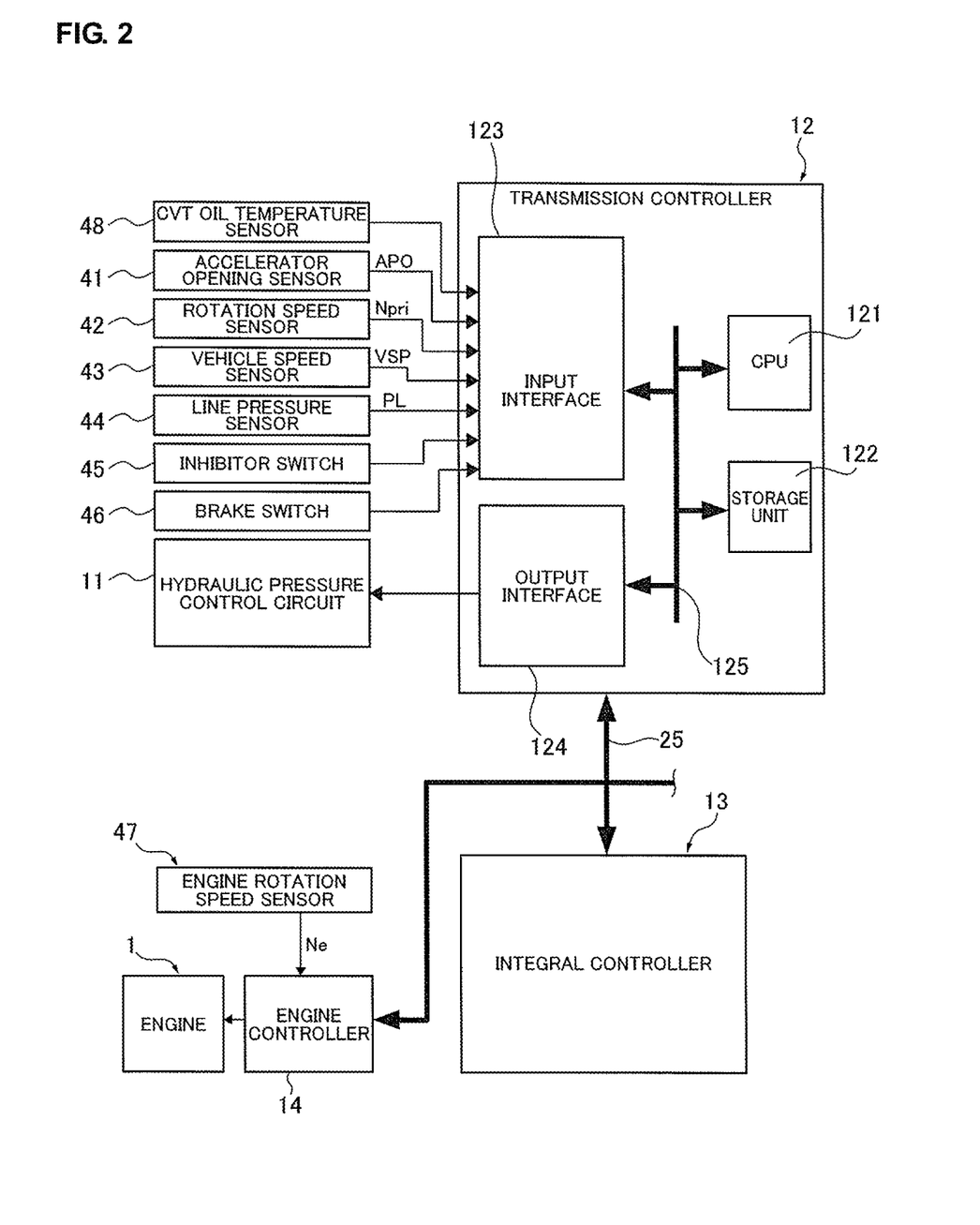
FIG. 2 is an internal block diagram of a transmission controller of the control device according to Embodiment 1.

FIG. 1 is an overall configuration diagram of the engine-driven vehicle having mounted thereon the continuously variable transmission with the sub-transmission mechanism, to which the control device of Embodiment 1 is applied. FIG. 2 is an internal block diagram of a transmission controller of the control device of Embodiment 1. The overall system configuration will be explained below with reference to FIGS. 1 and 2.

In the following explanation, a "transmission ratio" of a transmission mechanism refers to a value obtained by dividing an input rotation speed of the transmission mechanism by an output rotation speed of the transmission mechanism. Further, a "lowest transmission ratio" refers to a maximum transmission ratio of the transmission mechanism; and a "highest transmission ratio" refers to a minimum transmission ratio of the transmission mechanism.

As shown in FIG. 1, the engine-driven vehicle has, as a running drive source, an engine 1 equipped with a starter motor 15 for engine starting. An output rotation of the engine 1 is transmitted to drive wheels 7 via a torque converter 2 with a lock-up clutch 9, a reduction gear train 3, the continuously variable transmission 4 (hereinafter referred to as "automatic transmission 4") with the sub-transmission mechanism, a final gear train 5 and a final reduction gear unit 6. A parking mechanism 8 is provided on the final gear train 5 so as to mechanically lock an output shaft of the automatic transmission 4 during parking. The engine-driven vehicle also has, as a hydraulic pressure source, a mechanical oil pump 10 driven by power of the engine 1 and an electric oil pump 50 driven by power of a motor 51. Further, the engine-driven vehicle has: a hydraulic pressure control circuit 11 that regulates a hydraulic pressure discharged from the mechanical oil pump 10 and the electric oil pump 50 and supplies the regulated hydraulic pressure to respective parts of the automatic transmission 4; a transmission controller 12 that controls operations of the hydraulic pressure control circuit 11; an integral controller 13; and an engine controller 14. The respective parts and portions will be explained below in detail.

The automatic transmission 4 includes a belt-type continuously variable transmission mechanism (hereinafter referred to as "variator 20") and the sub-transmission mechanism 30 arranged in series with the variator 20. Herein, the expression "arranged in series" means that the variator 20 and the sub-transmission mechanism 30 are in series with each other on a power transmission path. The sub-transmission mechanism 30 may be directly connected to an output shaft of the variator 20 as in the present embodiment, or may be connected to the output shaft of the variator 20 via a different speed change or power transmission mechanism (such as gear train).

The variator 20 is in the form of a belt-type continuously variable transmission mechanism having a primary pulley 21, a secondary pulley 22 and a V belt 23 wound around the primary pulley 21 and the secondary pulley 22. Each of the pulleys 22 and 23 includes: a fixed conical plate; a movable conical plate having a sheave surface opposed to a sheave surface of the fixed conical plate so as to define a V-shaped groove between these sheave surfaces; and primary and secondary hydraulic cylinders 23a and 23b disposed on a back surface of the movable conical plate and each adapted to axially move the movable conical plate relative to the fixed conical plate. By regulating the supply of hydraulic pressures to the primary and secondary hydraulic cylinders 23a and 23b, a width of the V-shaped groove is varied to change a contact radius between the V belt 23 and the pulleys 21, 22 and thereby continuously vary a transmission ratio of the variator 20.

The sub-transmission mechanism 30 is in the form of a transmission mechanism having two forward gear stages and one reverse gear stage. The sub-transmission mechanism 30 includes: a Ravigneaux planetary gear unit 31 in which carriers of two planetary gears are coupled; and a plurality of frictional engagement elements (such as a low brake 32, a high clutch 33 and a reverse brake 34) connected to rotational elements of the Ravigneaux planetary gear unit 31 so as to change the states of connection with the rotational elements.

The gear stage of the sub-transmission mechanism 30 is changed when the engagement/disengagement states of the respective frictional engagement elements 32 to 34 are varied by regulating the hydraulic pressures supplied to the frictional engagement elements 32 to 34. For example, the gear stage of the sub-transmission mechanism 30 is set to a first forward speed (hereinafter referred to as "low speed mode") by engagement of the low brake 32 and by disengagement of the high clutch 33 and the reverse brake 34. The gear stage of the sub-transmission mechanism 30 is set to a second forward speed (hereinafter referred to as "high speed mode"), which is lower in transmission ratio than the first forward speed, by engagement of the high clutch 33 and by disengagement of the low brake 32 and the reverse brake 34. By engagement of the reverse brake 34 and by disengagement of the low brake 32 and the high clutch 33, the gear stage of the sub-transmission mechanism 30 is set to a reverse speed. The power transmission path to the drive wheels 7 is disconnected by disengagement of all of the low brake 32, the high clutch 33 and the reverse brake 34 of the sub-transmission mechanism 30.

As shown in FIG. 2, the transmission controller 12 has a CPU 121, a storage unit 122 including a RAM and a ROM, an input interface 123, an output interface 124 and a bus 125 connecting these components to each other. This transmission controller 12 functions to control the transmission ratio of the variator 20 and control the gear stage of the sub-transmission mechanism 30 to a given speed by engagement/disengagement of the plurality of frictional engagement elements (i.e. the low brake 32, the high clutch 33 and the reverse brake 34).

In the present embodiment, the transmission controller 12 includes a shift time constant setting portion configured to switch a shift time constant, which determines a change speed of the target transmission ratio, between shift time constant <speed>On and shift time constant <speed>Off. During normal control, the shift time constant is switched to the shift time constant <speed>Off so as to set the change speed of the target transmission ratio to a low speed. The change speed of the target transmission ratio is then lowered to ensure favorable shift performance. Upon a demand to set the change speed of the target transmission ratio to a high speed, the shift time constant is switched to the shift time constant <speed>On so as to raise the speed of change of the target transmission ratio to the desired transmission ratio.

There are provided: an accelerator opening sensor 41 for detecting an operating amount of an accelerator pedal (hereinafter referred to as "accelerator opening APO"); a rotation speed sensor 41 for detecting an input rotation speed of the automatic transmission 4 (that is, a rotation speed of the primary pulley 21; hereinafter referred to as "primary rotation speed Npri"); a vehicle speed sensor 43 for detecting a running speed VSP of the vehicle; a line pressure sensor 44 for detecting a line pressure of the automatic transmission 4 (hereinafter referred to as "line pressure PL"); an inhibitor switch 45 for detecting a position of a selector lever; a brake switch 46 for detecting a braking state; and the like. Output signals from these sensors and switches are inputted to the input interface 123.

The storage unit 122 stores a shift control program for shift control of the automatic transmission 4 and a shift map (see FIG. 3) used for the execution of the shift control program. The CPU 121 retrieves the shift control program stored in the storage unit 122, executes the retrieved shift control program to generate a shift control signal by performing various processing operations on the signals inputted through the input interface 123, and then, outputs the generated shift control signal to the hydraulic pressure control circuit 11 through the output interface 124. The various values used in the processing operations by the CPU 121 and the results of the processing operations are stored in the storage unit 121.

The hydraulic pressure control circuit 11 has a plurality of hydraulic passages and a plurality of hydraulic control valves and switches a hydraulic pressure supply path by controlling the plurality of hydraulic control valves on the basis of the shift control signal from the transmission controller 12.

The integral controller 13 executes integral control of the plurality of controllers mounted on the vehicle so as to ensure appropriate transmission and engine control operations by the transmission controller 12 and the engine controller 14. The integral controller 13 is connected to the other vehicle-mounted controllers such as transmission controller 12 and engine controller 14 via a CAN communication line 25 for information communication.

The engine controller 14 executes various engine control operations such as fuel-cut control during accelerator release and engine start control to start the engine 1 by the starter motor 15. There is provided an engine rotation speed sensor 47 for detecting a rotation speed of the engine 1 (hereinafter referred to as "engine rotation speed Ne"). To the engine controller 14, an output signal from this sensor is inputted.

[Configuration for Shift Control Based on Shift Map]

Figure 3:
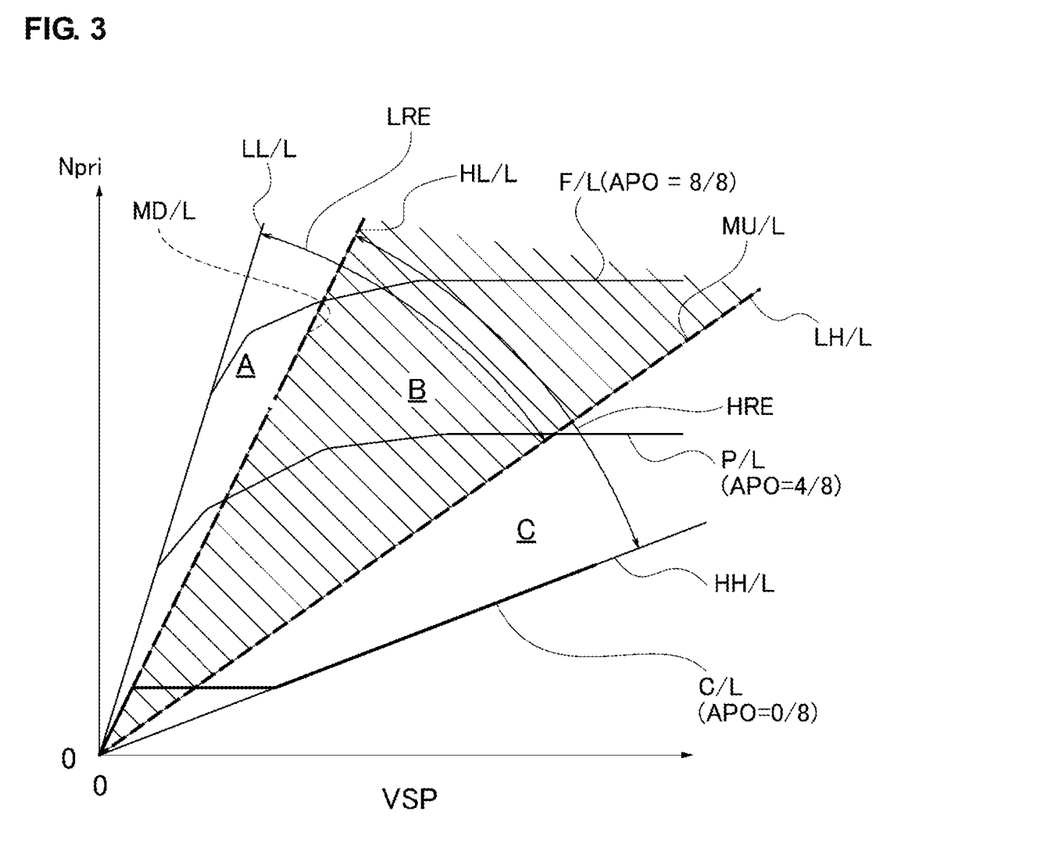
FIG. 3 is a diagram showing an example of a shift map stored in a storage unit of the transmission controller of the control device according to Embodiment 1.

FIG. 3 is a diagram showing an example of the shift map stored in the storage unit of the transmission controller. The configuration for the shift control based on the shift map will be explained below with reference to FIG. 3.

On the shift map of FIG. 3, an operating point of the automatic transmission 4 is determined by the vehicle running speed VSP and the primary rotation speed Npri. The slope of a line connecting the operating point of the automatic transmission 4 and the zero point on the lower left corner of the shift map corresponds to the transmission ratio of the automatic transmission 4 (more specifically, the overall transmission ratio obtained by multiplying the transmission ratio vVRATIO of the variator 20 by the transmission ratio subRATIO of the sub-transmission mechanism 30; hereinafter referred to as "actual through transmission ratio"). This shift map has defined thereon a shift line for each accelerator opening APO, so as to shift the automatic transmission 4 in accordance with the shift line selected based on the accelerator opening APO, as in the case of a shift map for a conventional belt continuously variable transmission. For the sake of simplicity, FIG. 3 shows only a full-load line (that is, a shift line at an accelerator opening APO=8/8), a partial-load line (that is, a shift line at an accelerator opening APO=4/8) and a coasting line (that is, a shift line at an accelerator opening APO=0/8).

In the low speed mode, the automatic transmission 4 can be shifted between a low-speed-mode lowest line LL/L obtained by setting the variator transmission ratio vVRATIO at the maximum transmission ratio and a low-speed-mode highest line LH/H obtained by setting the variator transmission ratio vVRATIO at the minimum transmission ratio. Namely, the operating point of the automatic transmission 4 is moved within A and B regions in the low speed mode. In the high speed mode, on the other hand, the automatic transmission 4 can be shifted between a high-speed-mode lowest line HL/L obtained by setting the variator transmission ratio vVRATIO at the maximum transmission ratio and a high-speed-mode highest line HH/L obtained by setting the variator transmission ratio vVRATIO at the minimum transmission ratio. Namely, the operating point of the automatic transmission 4 is moved within B and C regions in the high speed mode.

The transmission ratio of the sub-transmission mechanism 30 at each gear stage is set such that the transmission ratio corresponding to the low-speed-mode highest line LH/L (low-speed-mode highest transmission ratio) becomes lower than the transmission ratio corresponding to the high-speed-mode lowest line HL/L (high-speed-mode lowest transmission ratio). Herein, a range of the actual through transmission ratio vRATIO attainable by the automatic transmission 4 in the low speed mode is referred to as "low-speed-mode ratio range LRE"; and a range of the actual through transmission ratio vRATIO attainable by the automatic transmission 4 in the high speed mode is referred to as "high-speed-mode ratio range HRE". By the above setting, the low-speed-mode ratio range LRE and the high-speed-mode ratio range HRE partially overlap each other. Accordingly, the automatic transmission 4 can select either the low speed mode or the high speed mode when the operating point of the automatic transmission 4 is in the B region (overlap region) between the high-speed-mode lowest line HL/L and the low-speed-mode highest line LH/L.

The transmission controller 12 (as a shift control unit) is configured to set, as a desired through transmission ratio vDRATIO, the through transmission ratio corresponding to the vehicle running speed VSP (as a running state of the vehicle) and the accelerator opening APO (as a driver' operating action) with reference to the shift map. (This function constitutes a desired transmission ratio setting portion.) The desired through transmission ratio vDRATIO is a target value which the actual through transmission ratio vRATIO finally reaches in this driving state. The transmission controller 12 is configured to set a target through transmission ratio vRATIO0 which is a transient target value for allowing the actual through transmission ratio vRATIO to follow the desired through transmission ratio vDRATIO with a desired response characteristic. (This function constitutes a target transmission ratio setting portion.) The transmission controller 12 is further configured to control the variator 20 and the sub-transmission mechanism 30 so as to adjust the actual through transmission ratio vRATIO to the target through transmission ratio vRATIO0.

The shift map has defined thereon a mode switching upshift line MU/L for upshift of the sub-transmission mechanism 30 (that is, a 1-2 upshift line for the sub-transmission mechanism 30). This mode switching upshift line substantially overlaps the low-speed-mode highest line LH/L. The actual through transmission ratio vRATIO corresponding to the mode switching shift line MU/L is substantially equal to the low-speed-mode highest line LH/L (low-speed-mode highest transmission ratio). The shift map has also defined thereon a mode switching downshift line MD/L for downshift of the sub-transmission mechanism 30 (that is, a 2-1 downshift line for the sub-transmission mechanism 30). This mode switching downshift line substantially overlaps the high-speed-mode lowest line HL/L. The actual through transmission ratio vRATIO corresponding to the mode switching shift line MD/L is substantially equal to the high-speed-mode lowest transmission ratio (high-speed-mode lowest line HL/L).

The transmission controller 12 is configured to execute mode switching shift control when the operating point of the automatic transmission 4 crosses the mode switching downshift line MD/L, i.e., when the target through transmission ratio vRATIO0 of the automatic transmission 4 is changed across or matched with a mode switching transmission ratio mRATIO. In the mode switching shift control, the transmission controller 12 performs coordinate shift to cause shift of the variator in coordination of shift of the sub-transmission mechanism 30 so as to vary the variator transmission ratio vVRATIO in a direction opposite to a direction in which the transmission ratio subRATIO of the sub-transmission 30 is varied.

During the coordinate shift control, the transmission controller 12 makes a 1-2 upshift judgment when the target through transmission ratio vRATIO0 of the automatic transmission 4 is changed from the B region side to the C region side across the mode switching upshift line MU/L or is matched with the mode switching upshift line MU/L from the B region side. Upon making the 1-2 upshift judgment, the transmission controller 12 changes the gear stage of the sub-transmission mechanism 30 from the first speed to the second speed and varies the variator transmission ratio vVRATIO from the highest transmission ratio value to a low transmission ratio value. The transmission controller 12 makes a 2-1 downshift judgment when the target through transmission ratio vRATIO0 of the automatic transmission 4 is changed from the B region side to the A region side across the mode switching downshift line MD/L or is matched with the mode switching downshift line MD/L from the B region side. Upon making the 2-1 downshift judgment, the transmission controller 12 changes the gear stage of the sub-transmission mechanism 30 from the second speed to the first speed and varies the varies the variator transmission ratio vVRATIO from the lowest transmission ratio value to a high transmission ratio value.

The reason for performing the coordinate shift to vary the transmission ratio vRatio of the variator 20 at the mode switching upshift or mode switching downshift is to not only suppress driver's uncomfortable feeling due to variation of the input rotation speed caused by stepwise changes in the actual through transmission ration vRATIO of the automatic transmission 4, but also ease shift shock of the sub-transmission mechanism 30.

When the high clutch 33 is engaged from the state where the low brake 32, the high clutch 33 and the reverse brake 34 of the sub-transmission mechanism 30 are in disengagement, the automatic transmission 4 is placed into the high speed mode of "transmission ratio=1". In other words, the actual through transmission ratio vRATIO at the time of engagement of the high clutch 33 matches with the variator transmission ratio vVRATIO.

[Instantaneous Interruption Recovery Control Process]

Figure 4:
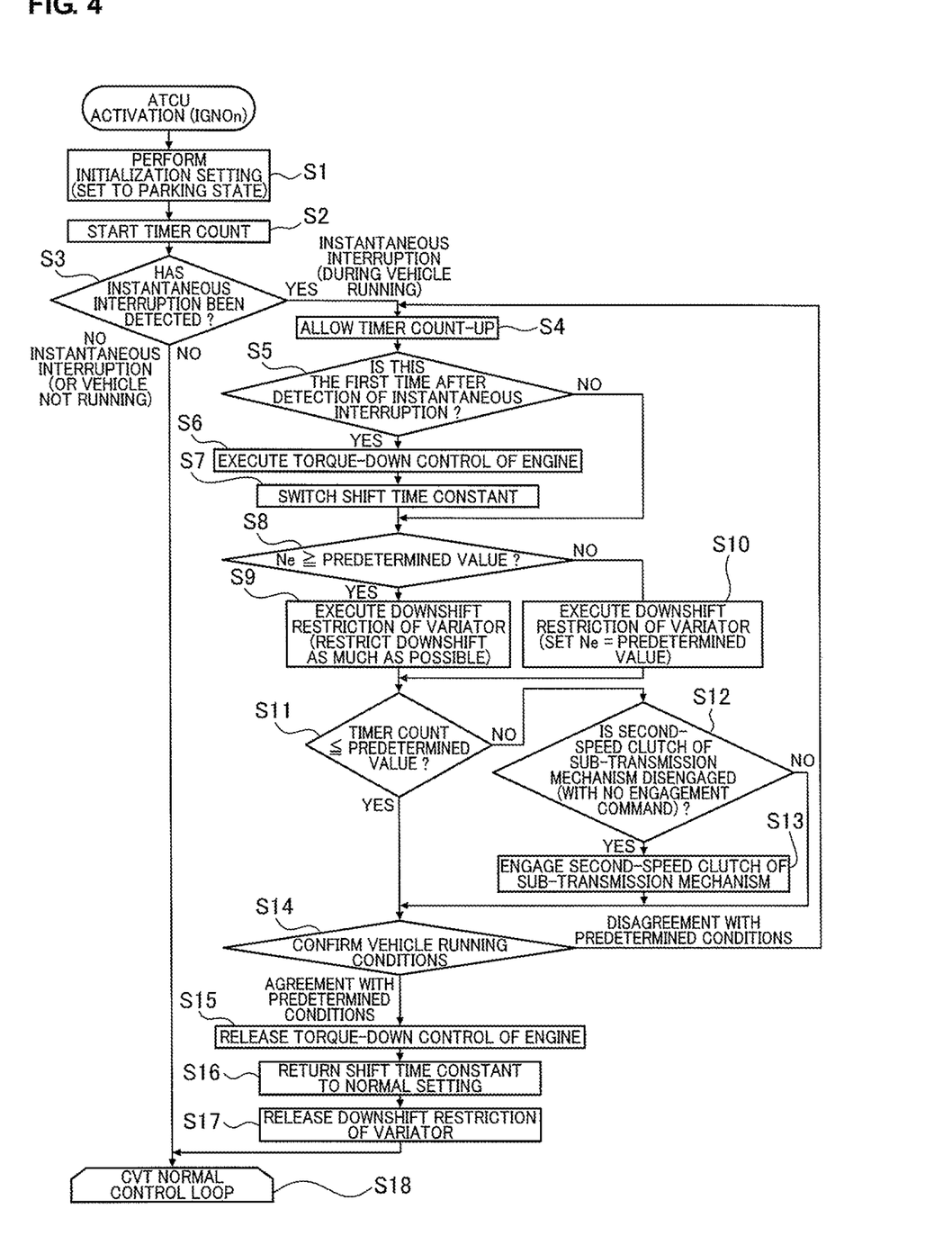
FIG. 4 is a flowchart for instantaneous interruption recovery control carried out by the transmission controller of the control device according to Embodiment 1.

FIG. 4 is a flowchart for instantaneous interruption recovery control process carried out by the transmission controller 12 (shift control unit) in Embodiment 1. (This function constitutes an instantaneous interruption recovery control portion.) The respective steps of the instantaneous interruption recovery control process of FIG. 4 will be explained in detail below.

The transmission controller 12 (ATCU) is activated upon a power reset. At step S1, the transmission controller performs the initialization setting for the parking state (VSP=0) on the assumption that an ignition switch is turned on by a driver during parking. The process then proceeds to step S2.

By the initialization setting, both of the target through transmission ratio vRATIO0 and the desired through transmission ratio vRATIO are changed, from a highest transmission ratio value attained during an instantaneous interruption to a lowest transmission ratio value corresponding to the parking state, after the lapse of a OS start-up time of the transmission controller 12. Further, the low brake 32, the high clutch 33 and the reverse brake 34 of the sub-transmission mechanism 3 are disengaged; and the lock-up clutch 9 of the torque converter 2 is disengaged.

Subsequent to the initialization setting at step S1, the transmission controller starts a key-on timer at step S2 to count the time elapsed from the initiation of the instantaneous interruption recovery control. The process then proceeds to step S3.

Subsequent to the count start of the key-on timer at step S2, the transmission controller judges at step S3 whether an instantaneous interruption has been detected during running of the vehicle. When Yes at step S3 (i.e. when an instantaneous interruption has been detected during running of the vehicle), the process proceeds to step S4. When No at step S3 (i.e. when an instantaneous interruption has not been detected or when an instantaneous detection has been detected during non-running of the vehicle), the process proceeds to a CVT normal control loop of step S18.

Herein, the instantaneous interruption means a state where power is instantaneously interrupted due to unstable contact of the power supply cable or ATCU connection line by input of vibrations etc. during running of the vehicle. The terms "instantaneous interruption recovery" and "power reset" are thus used as the same meaning.

When Yes at step S3, the transmission controller sets an instantaneous interruption recovery judgment flag (fHVSPINI) that indicates a recovery from an instantaneous interruption during high-speed running of the vehicle (fHVSPINI=1). The condition for setting the instantaneous interruption recovery judgment flag (fHVSPINI) is an "AND" condition where both of: (1) vKEYONTMR≤constant A (see FIG. 5); and (2) VSPRR and vVSPRL≥constant B (see FIG. 5) or OUTREVB≥constant C (see FIG. 5) are satisfied.

The transmission controller allows the key-on timer to count up at step S4 subsequent to judging at step S3 that the instantaneous interruption has been detected during running of the vehicle or subsequent to judging at step S14 that the current running conditions of the vehicle are in agreement with predetermined running conditions. Then, the process proceeds to step S5.

Subsequent to the count-up of the key-on timer at step S4, the transmission controller judges at step S5 whether this is the first time after the detection of the instantaneous interruption. When Yes at step S5 (i.e. when this control routine is executed for the first time after the detection of the instantaneous interruption), the process proceeds to step S6. When No at step S5 (i.e. when this control routine is the second time or later after the detection of the instantaneous interruption), the process proceeds to step S8.

Subsequent to judging at step S5 that this control routine is the first time after the detection of the instantaneous interruption, the transmission controller executes torque-down control of the engine 1 according to a torque-down demand at step S6. The process proceeds to step S7.

Subsequent to the torque-down control at step S6, the transmission controller switches the shift time constant from the shift time constant <speed>Off to the shift time constant <speed>On at step S7. The process proceeds to step S8.

The shift time constant is a delay time constant that determines the change speed of the target through transmission ratio vRATIO0. The larger the value of the shift time constant, the lower the change speed of the target through transmission ratio. The smaller the value of the shift time constant, the higher the change speed of the target through transmission ratio. In a normal running state where there occurs no power reset during running, the shift time constant <speed>Off is selected such that the change speed of the target through transmission ratio vRATIO0 is set low to prevent overshoot of the transmission ratio during shift or to prevent small repetitive runouts of the transmission ratio in the vicinity of the target transmission ratio during steady running. When the shift time constant <speed>On is selected, on the other hand, the shift time constant is set such that the change speed of the target through transmission ratio vRATIO0 becomes the highest within the range that there does not occur slippage of the belt. By this selection, the speed of change of the target transmission ratio to the desired transmission ratio is set higher.

The transmission controller judges whether the engine rotation speed Ne is higher than or equal to a predetermined value at step S8 subsequent to the switching of the shift time constant at step S7 or subsequent to judging at step S5 that this control routine is the second time or later after the detection of the instantaneous interruption. When Yes at step S8 (i.e. when Ne≥predetermined value), the process proceeds to step S9. When No at step S8 (i.e. when Ne<predetermined value), the process proceeds to step S10.

The predetermined value of the engine rotation speed Ne is herein set to an engine rotation speed value at which engine stall may occur unless the engine rotation speed is increased by downshift.

Subsequent to the judgment of Ne≥predetermined value at step S8, the transmission controller executes downshift restriction of the variator 20 (so as to restrict downshift of the variator as much as possible) at step S9. For example, downshift of the variator 20 may be prohibited at step S9. The process then proceeds to step S11.

Subsequent to the judgment of Ne<predetermined value at step S8, the transmission controller executes downshift restriction of the variator 20 (so as to perform downshift and thereby set Ne=predetermined value) at step S10. The process then proceeds to step S11.

The transmission controller judges whether the count value of the key-on timer is smaller than or equal to a predetermined value at step S11 subsequent to the downshift restriction of the variator 20 at step S9 or step S10. When Yes at step S11 (i.e. when timer value≤predetermined value), the process proceeds to step S14. When No at step S11 (i.e. when timer value>predetermined value), the process proceeds to step S12.

The predetermined value is herein set to a waiting time from the power reset to the stabilization of the hydraulic pressure.

Subsequent to the judgment of timer value>predetermined value at step S11, the transmission controller judges at step S12 whether the high clutch 33 of the sub-transmission mechanism 30 is disengaged. When Yes at step S12 (i.e. when the second-speed clutch is disengaged), the process proceeds to step S13. When No at step S12 (i.e. when the second-speed clutch is engaged), the process proceeds to step S14.

Subsequent to the judgment of the second-speed clutch disengagement state at step S12, the transmission controller outputs a command to engage the high clutch 33 of the sub-transmission mechanism 30 at step S13. The process then proceeds to step S14.

By engagement of the high clutch 33 of the sub-transmission mechanism 30 according to the engagement command, the sub-transmission mechanism 30 is shifted to the second speed (direction connection mode).

Subsequent to the judgment of timer value≤predetermined value at step S11, the judgment of the second-speed clutch engagement state at step S12 or the output of the engagement command to the high clutch 33 at step S13, the transmission controller judges at step S14 whether the current running conditions of the vehicle are in agreement with the predetermined running conditions for shifting to the normal control. When the current running conditions are in agreement with the predetermined running conditions, the process proceeds to step S15. When the current running conditions are in disagreement with the predetermined running conditions, the process proceeds back to step S4.

The judgment of agreement of the current running conditions with the predetermined running conditions means completion of the instantaneous interruption recovery control. The judgment of disagreement of the current running conditions with the predetermined running conditions means continuation of the instantaneous interruption recovery control. Further, the normal control refers to shift control with selection of the shift time constant <speed>Off.

Upon judging at step S14 that the current running conditions are in agreement with the predetermined running conditions, the transmission controller clears the instantaneous interruption recovery judgment flag (fHVSPINI) set at step S3 (fHVSPINI=0). The condition for clearing the instantaneous interruption recovery judgment flag (fHVSPINI) is an "OR" condition where either (1) vDRATIO≈vRATIO0 (|vDRATIO−vRATIO0|≤constant E; see FIG. 5), (2) timer value>forced termination timer value (=constant D) or (3) upshift of the variator 20 (vVRATIO0_old>vVRATIO0) is satisfied.

Subsequent to judging at step S14 that the current running conditions are in agreement with the predetermined running conditions, the transmission controller releases the torque-down control of the engine at step S15. The process proceeds to step S16.

The transmission controller returns the shift time constant to its normal setting at step S16 subsequent to the release of the engine torque-down control at step S15. The process proceeds to step S17.

When the shift time constant is returned to its normal setting, it means that the shift time constant is switched from the shift time constant <speed>On to the shift time constant <speed>Off.

The transmission controller further releases the downshift restriction of the variator 20 at step S17 subsequent to the switching of the shift time constant back to its normal setting at step S16. The process then proceeds to step S18.

The transmission controller enters the CVT normal control loop at step S18 subsequent to judging at step S3 that the instantaneous interruption has not been detected or has been detected during non-running of the vehicle, or subsequent to the release of the variator downshift restriction at step S17.

By the execution of the CVT normal control loop, the lock-up clutch 9 of the torque converter 2 is engaged upon satisfaction of a vehicle speed condition.

Next, the operations of the engine-driven vehicular variator control device of Embodiment 1 will be explained below under the headings of "Procedure of Instantaneous Interruption Recovery Control", "Instantaneous Interruption Recovery Control Operations" and "Characteristic Features of Instantaneous Interruption Recovery Control".

[Procedure of Instantaneous Interruption Recovery Control]

The instantaneous interruption recovery control procedure of the control device of Embodiment 1 will be explained below with reference to the flowchart of FIG. 4.

When power is reset, the process proceeds through step S1, step S2 and step S3 in the flowchart of FIG. 4. Upon activation of the transmission controller 12, the initialization setting is performed at step S1 so as to change both of the target through transmission ratio vRATIO0 and the desired through transmission ratio vDRATIO from a highest transmission ratio value attained during an instantaneous interruption to a lowest transmission ratio value corresponding to the parking state. At step S2, the key-on timer is started to count the time elapsed from the initiation of the instantaneous interruption recovery control. At step S3, it is judged whether an instantaneous interruption has been detected during running of the vehicle. When an instantaneous interruption has not been detected or has been detected during non-running of the vehicle, the process proceeds from step S3 to step S18. The CVT normal control loop is started directly at step S18.

In the case where the instantaneous interruption recovery control is performed for the first time upon a power reset after the detection of an instantaneous interruption during running, the process proceeds through step S4, step S5, step S6, step S7 and then step S8 in the flowchart of FIG. 4. At step S6, the torque-down control of the engine 1 is executed according to a torque-down demand. At step S7, the shift time constant is switched from the shift time constant <speed>Off to the shift time constant <speed>On. At step S8, it is judged whether the engine rotation speed Ne is higher than or equal to the predetermined value. When engine rotation speed Ne≥predetermined value at step S8, the process proceeds to step S9. At step S9, the downshift restriction of the variator 20 is executed so as to minimize downshift. When engine rotation speed Ne<predetermined value at step S8, the process proceeds to step S9. At step S10, the downshift restriction of the variator 20 is executed so as to perform downshift and thereby set Ne=predetermined value. After that, the process repeatedly proceeds through step S14, step S4, step S5, step S8 and step S9 or S10 in the flowchart of FIG. 4.

When it is judged at step S11 that the timer value exceeds the predetermined value, the process proceeds from step S12 to step S13. When it is judged at step S12 that the sub-transmission mechanism is in the second-speed clutch disengagement state, the engagement command is outputted to the high clutch 33 of the sub-transmission mechanism at step S13. After the completion of engagement of the high clutch 33 of the sub-transmission mechanism 33, it is judged at step S14 that the current running conditions of the vehicle are in agreement with the predetermined running conditions for shifting to the normal control. When the current running conditions are in agreement with the predetermined running conditions, the process proceeds from step S14 to step S15, step S16, step S17 and then to step S18. At step S15, the torque-down control of the engine is released. At step S16, the shift time constant is switched back to its normal setting. At step S17, the downshift restriction of the variator 20 is released. Then, the CVT normal control loop is started at step S18.

As explained above, the control device of Embodiment 1 performs the instantaneous interruption recovery control by the torque-down control of the engine, the switching of the shift time constant of the target through transmission ratio vRATIO0 and the downshift restriction of the variator 20 upon the recovery (power reset) from the instantaneous interruption during running of the vehicle. Upon satisfaction of the conditions for shifting from the instantaneous interruption recovery control to the normal control, the control device starts the CVT normal control loop by releasing the torque-down control of the engine, switching the shift time constant of the target through transmission ratio vRATIO0 back to its original setting and releasing the downshift restriction of the variator 20.

[Instantaneous Interruption Recovery Control Operations]

The instantaneous interruption recovery control operations of the control device of Embodiment 1 will be explained below, in comparison with a comparative example, with reference to the time chart of FIG. 5.

The comparative example refers to the case where, at the time of recovery from an instantaneous interruption during running of the vehicle, the shift time constant of the target through transmission ratio vRATIO0 is maintained at the same slow speed as that under the normal control.

Figure 5:
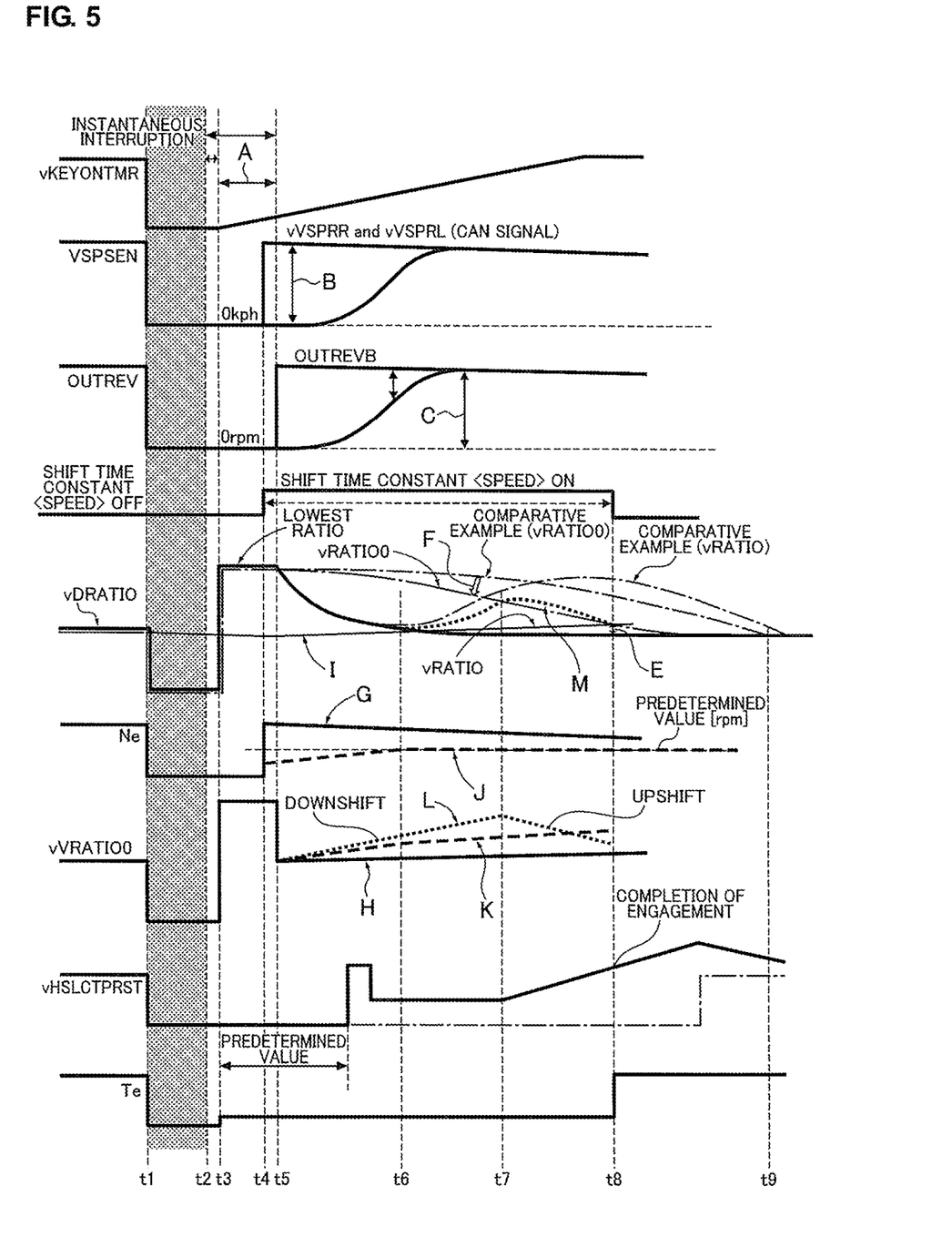
FIG. 5 is a time chart showing operation characteristics, such as key-on timer status (vKEYONTMR), vehicle speed sensor value (VSPSEN), transmission output rotation speed (OUTREV), shift time constant <speed>, desired through transmission ratio (vDRATIO0), target through transmission ratio (vRATIO0), actual through transmission ratio (vRATIO), engine rotation speed (Ne), target variator transmission ratio (vVRATIO0), high clutch hydraulic command value (vHSLCTPRST) and engine torque (Te), under the control of the control device according to Embodiment 1 before and after the occurrence of an instantaneous interruption.

In the comparative example, the speed of change of the target through transmission ratio vRATIO0 from the lowest transmission ratio value at time t4 to the desired through transmission ratio vDRATIO for shifting to the normal control is low as shown by one-dot chain vRATIO0 characteristic line (thin line) in FIG. 5. This results in a large deviation between the target through transmission ratio vRATIO0 and the actual through transmission ratio vRATIO. The actual through transmission ratio vRATIO is hence shifted down to the lowest transmission ratio value as shown by one-dot chain vRATIO characteristic line (thin line) in FIG. 5. As the speed of change of the target through transmission ratio vRATIO0 to the desired through transmission ratio vDRATIO is low, the state of vDRATIO≈vRATIO0 is reached at time t9 as shown in FIG. 5. Namely, it takes a long time to converge the target through transmission ratio vRATIO0 to the desired through transmission ratio vDRATIO. There arises a problem that the engine rotation speed may become unnecessarily high due to a long duration of downshift in which the input rotation speed of the transmission is set high.

In Embodiment 1, by contrast, the shift time constant of the target through transmission ratio vRATIO0 is switched, from a shift time constant value used under the normal control to a shift time constant value at which the change speed of the target through transmission ratio vRATIO0 is higher, upon the recovery from the instantaneous interruption during running of the vehicle.

In FIG. 5, time t1 indicates a start time of an instantaneous interruption during high-speed running; time t2 indicates a completion time of the instantaneous interruption during high-speed running; time t3 indicates a time of ACTU activation; time t4 indicates a time of switching of the shift time constant; time t5 indicates a time at which shift is started under the instantaneous interruption recovery control and at which the desired through transmission ratio vDRATIO deviates from the lowest transmission ratio value; time t6 indicates a time at which the engine rotation speed Ne reaches the predetermined value under the downshift restriction of the variator 20; time t7 indicates a time at which the variator 20 is switched from downshift to upshift without the execution of the downshift restriction; time t8 indicates a time at which the target through transmission ratio is converged to the desired through transmission ratio in Embodiment 1 and at which engagement of the high clutch 33 is completed; and time t9 indicates a time at which the target through transmission ratio is converged to the desired through transmission ratio in the comparative example.

In Embodiment 1, the shift time constant is switched from the shift time constant <speed>Off to the shift time constant <speed>On at time t4. The change speed of the target through transmission ratio vRATIO0 from the lowest transmission ratio value at time t4 to the desired through transmission ratio vDRATIO for shifting to the normal control is thus set higher than that in the comparative example as shown by one-dot chain vRATIO0 characteristic line (thick line) and by an arrow F in FIG. 5. As shown by a thick characteristic line in FIG. 5, the desired through transmission ratio vDRATIO is set based on the vehicle speed sensor value vSPSEN (after filtering) and hence changed to the transmission ratio value for shifting to the normal control, in accordance with changes in the vehicle speed sensor value VSPSEN, after the recovery from the instantaneous interruption.

The following explanation will be given separately of the shift control operations of the variator 20 upon the recovery from the instantaneous interruption in the case where the engine rotation speed Ne is higher than or equal to the predetermined value at the start of the instantaneous interruption recovery control and is maintained at such a high level and in the case where the engine rotation speed Ne is lower than the predetermined value at the start of the instantaneous interruption recovery control.

It is first assumed that the engine rotation speed Ne is maintained higher than the predetermined value during a period from time t4 to time t8 as shown by solid characteristic line G in FIG. 5. In this case, the target variator transmission ratio vVRATIO0 is set as shown by solid characteristic line H in FIG. 5. More specifically, the downshift restriction is executed so as to avoid downshift as much as possible. Under such strong downshift restriction, the target through transmission ratio vVRATIO0 is changed, from the actual variator transmission ratio value at time t5, with a gentle slope in the downshift direction during a period from time t5 to time t8

With gentle changes in the target variator transmission ratio vVRATIO0 in the downshift direction, the actual through transmission ratio vRATIO is changed with a gentle slope in the downshift direction during a period from time t5 to time t8 as shown by solid characteristic line I in FIG. 5. When the condition of |vDRATIO−vRATIO0|≤constant E is satisfied simultaneously with completion of the engagement of the high clutch 33 at time 8, the instantaneous interruption recovery control is completed. The shift time constant is then switched from the <speed>On to the shift time constant <speed>Off.

Next, it is assumed that the engine rotation speed Ne is lower than the predetermined value during a period from time t4 to time 6 but becomes higher than the predetermined value during a period from time 6 to time 8 as shown by broken characteristic line J in FIG. 5. In this case, the downshift restriction is executed so as to raise the engine rotation speed Ne to the predetermined value. Under such weak downshift restriction, the target variator transmission ratio vVRATIO0 is changed from the actual variator transmission ratio value at time t5 in the downshift direction during a period from time t5 to t6 as shown by broken characteristic line K in FIG. 5. At time t6 at which the engine rotation speed Ne reaches the predetermined value, the weak downshift restriction is switched to the strong downshift restriction. As the strong downshift restriction is executed so as to avoid downshift of the variator as much as possible, the target through transmission ratio vVRATIO0 is changed with a gentle slope in the downshift direction during a period from time t6 to time t8. With gentle changes in the target variator transmission ratio vVRATIO0 in the downshift direction, the engine rotation speed Ne is controlled to the predetermined value as shown by broken characteristic line J in FIG. 5.

When the change speed of the target through transmission ratio vRATIO0 is raised by switching the shift time constant in FIG. 5, the "characteristics of the comparative example (vRATIO) shown by one-dot chain line (thin line) in FIG. 5"

become the "characteristics of the actual through transmission ratio vRATIO shown by dotted line M in FIG. 5". When the change speed of the target transmission ratio is further raised by switching the shift time constant, and the downshift of the variator is restricted, the "characteristics of the actual through transmission ratio vRATIO shown by dotted line M in FIG. 5" becomes the characteristics of the actual through transmission ratio vRATIO shown by solid line I in FIG. 5".

Herein, the "characteristics of the comparative example (vRATIO) shown by one-dot chain line (thin line) in FIG. 5" and the "characteristics of the actual through transmission ratio vRATIO shown by dotted line M in FIG. 5" are calculated values based on the sensor values (VSPSEN, OUTREV). These values are consequently similar to the lowest transmission ratio value at around times t3 to t5 and similar to the desired through transmission ratio vDRATIO after times t3 to t5. The calculated actual through transmission ratio vRATIO shows such values before time t6 because the sensor values are reset upon the occurrence of the instantaneous interruption. However, the non-calculated actual through transmission ratio vRATIO (as obtained in the case where the sensor values are not reset and are read as rotational speed measurements) takes a value shown by line I, rather than the lowest transmission ratio value.

Under the instantaneous interruption recovery control, the engine rotation speed Ne is slightly lowered even during the downshift as shown by a solid characteristic line G in FIG. 5, the characteristics of. Further, the engine rotation speed Ne is maintained at the predetermined value even during the downshift as indicated by a broken characteristic line J in FIG. 5. It is because: the engine 1 under the torque-down control is connected to the variator 20 via the torque converter 2; and the torque converter 2 allows differential rotation between the engine 1 and the variator 20 by relative slippage.

In the above comparative example where the shift time constant of the target through transmission ratio vRATIO0 is maintained the same as under the normal control, the downshift of the variator 20 is performed to cause a large change in transmission ratio during the instantaneous interruption recovery control. There is thus a possibility that the rotation of the engine 1 may become unnecessarily high. In such a case, the time period required to converge the target through transmission ratio vRATIO0 to the desired through transmission ratio vDRATIO and return to the CVT normal control is up until time t9.

In Embodiment 1, by contrast, the shift time constant of the target through transmission ratio vRATIO0 is switched such that the change speed of the target through transmission ratio vRATIO0 is set higher under the instantaneous interruption recovery control than that under the normal control; and the downshift restriction of the variator 20 is executed. The rotation of the engine 1 is thus prevented from becoming unnecessarily high. The time period required to converge the target through transmission ratio vRATIO0 to the desired through transmission ratio vDRATIO and return to the CVT normal control is from time t5 to time t8 (<t9), which is shorter than the time period from time t5 to time t9 as required in the comparative example.

[Characteristic Features of Instantaneous Interruption Recovery Control]

In Embodiment 1, when power is reset from an instantaneous interruption during running, the change speed of the target through transmission ratio vRATIO0 from the lowest transmission ratio value to the desired through transmission ratio vDRATIO is set higher than that under the normal control before the time (t5) at which the desired through transmission ratio vDRATIO deviates from the lowest transmission value.

During a short time before and after the instantaneous interruption, there is no sudden change in the actual through transmission ratio vRATIO. The actual through transmission ratio vRATIO at the power reset is in the vicinity of the transmission ratio value for shifting to the normal control so that the amount of change of the actual through transmission ratio vRATIO is small. However, the target through transmission ratio vRATIO0 is set to the lowest transmission ratio value by initialization from the instantaneous interruption so that the amount of change of the target through transmission ratio vRATIO0 from the lowest transmission ratio value to the desired through transmission ratio vDRATIO is large.

Upon the power reset from the instantaneous interruption during the running, the change speed of the target through transmission ratio vRATIO0 is set higher than that during the normal control as mentioned above. Thus, the time required to converge the target through transmission ratio vRATIO0 to the desired through transmission ratio vDRATIO after the power reset is shortened as compared with the case where the change speed of the target through transmission ratio is maintained at the same slow speed as under the normal control. This provides the effect that, when the power reset is generated from the instantaneous interruption during the running, the rotation of the engine 1 is prevented from becoming unnecessarily high due to downshift of the variator 20.

It is consequently possible to, when the power is reset from the instantaneous interruption during the running, prevent the rotation of the engine 1 from becoming unnecessarily high.

In Embodiment 1, the high clutch 33 is arranged in series with the variator 20; the engagement of the high clutch 33 is started after the lapse of predetermined time from the power reset. Further, the instantaneous interruption recovery control portion (FIG. 4) is configured to set the change speed of the target through transmission ratio vRATIO0 so as to converge the target through transmission ratio vRATIO0 to the desired through transmission ratio vDRATIO before the completion time (t8) of engagement of the high clutch 33.

The drive force of the engine 1 is transmitted to the drive wheels 7 when the engagement of the high clutch 33 is completed after the power reset. By converging the target through transmission ratio vRATIO0 to the desired through transmission ratio vDRATIO before the completion time of the engagement of the high clutch 33, the control is switched from the instantaneous interruption recovery control to the normal control at the time of transmission of the drive force. By matching the actual through transmission ratio vRATIO with the target through transmission ratio vRATIO0 (desired through transmission ratio vDRATIO) before the engagement of the high clutch 33, the rotation of the engine 1 is prevented from becoming excessively high at the time of engagement of the high clutch 33. Until the engagement of the high clutch 33 is completed, the rotation of the engine 1 does not become high due to incomplete engagement of the high clutch 33 even in the case where the actual through transmission ratio vRATIO is unintentionally shifted down.

It is thus possible, by switching from the instantaneous interruption recovery control to the normal control at the time of transmission of the drive force, to reliably prevent the rotation of the engine 1 from becoming unnecessarily high.

In Embodiment 1, the transmission controller 12 is provided with the shift time constant setting portion to set the shift time constant that determines the change speed of the target through transmission ratio vRATIO0. Under the instantaneous interruption recovery control, the shift time constant set by the shift time constant setting portion is switched to vary the change speed of the target through transmission ratio vRATIO0.

It is thus possible to raise the change speed of the target through transmission ratio vRATIO0 from the lowest transmission ratio value to the desired through transmission ratio vDRATIO only with such a simple configuration for switching the shift time constant set by the shift time constant setting portion.

In Embodiment 1, the engine 1 is arranged as the running drive source; and the downshift itself of the variator 20 is restricted under the instantaneous interruption recovery control after the power reset.

It is thus possible to effectively restrict the downshift of the variator by not only executing the downshift restriction of the variator with the switching of the change speed of the target through transmission ratio vRATIO0 but also restricting the downshift itself of the variator 20.

There is a case where, due to variations, the high clutch 33 is engaged at a time earlier than intended. In such a case, the rotation of the engine 1 may become unnecessarily high due to the downshift of the variator 20.

It is thus possible by restricting the downshift itself of the variator 20 to prevent the rotation of the engine 1 from becoming unnecessarily high even in the case where the engagement time of the high clutch 33 is earlier than intended.

In Embodiment 1, the downshift of the variator 20 is avoided as much as possible when the engine rotation speed Ne is higher than or equal to the predetermined value under the instantaneous interruption recovery control.

It is thus possible to prevent the rotation of the engine 1 from becoming unnecessarily high when the engine rotation speed Ne is higher than or equal to the predetermined value. For example, it is possible by prohibiting the downshift of the variator 20 to reliably prevent the rotation of the engine 1 from becoming unnecessarily high.

Furthermore, the downshift restriction of the variator 20 is relieved when the engine rotation speed Ne is lower than the predetermined value under the instantaneous interruption recovery control in Embodiment 1.

When the engine rotation speed is low, the input rotation speed of the variator 20 is low. In the case of deceleration running upon the power reset, for example, the input rotation speed of the variator 20, that is, the engine rotation speed Ne is decreased with decrease in the vehicle running speed. There is a possibility that the engine rotation speed Ne may become lower than a self-sustaining rotation speed to cause engine stall, due to failure in intended downshift, in the case where the strong downshift restriction is executed under the situation where the engine rotation speed Ne is decreased.

As in the case of deceleration running, there is a possibility of engine stall in the operation scene that the engine rotation speed Ne is decreased when the two-speed sub-transmission mechanism 30 of Embodiment 1 shifts from the first-speed stage to the second-speed stage upon a power reset during running of the vehicle at a speed VSP lower than the predetermined value.

It is thus possible to avoid the occurrence of engine stall by relieving the downshift restriction, i.e., increasing the allowable amount of the downshift, when the engine rotation speed Ne is lower than the predetermined value, as compared with the case where the engine rotation speed Ne is higher than or equal to the predetermined value.

The effects of the vehicular variator control device will be explained below.

The vehicular variator control device of Embodiment 1 provides the following effects.

(1) The vehicular variator control device is for controlling the variator 20 of the vehicle. The variator is arranged between the running drive source (engine 1) and the drive wheels 7 to continuously vary the transmission ratio.

The vehicular variator control device has the shift control unit (transmission controller 12) to control the actual transmission ratio of the variator to the target transmission ratio. The shift control unit includes: the desired transmission ratio setting portion configured to set the desired transmission ratio (desired through transmission ratio vDRATIO) of the variator 20 according to at least one of a driver's operating action and a running state of the vehicle; and the target transmission ratio setting portion configured to set the target transmission ratio (target through transmission ratio vRATIO0) so as to change the actual transmission ratio (actual through transmission ratio vRATIO) to the desired transmission ratio at a given shift speed. The shift control unit (transmission controller 12) also includes the instantaneous interruption recovery control portion. The instantaneous interruption recovery control portion (FIG. 4) is configured to, upon a power reset from an instantaneous interruption during running, set the target transmission ratio (target through transmission ratio vRATIO0) and the desired transmission ration (desired through transmission ratio vDRATIO) to a lowest transmission ratio value by initialization and perform recovery control to recover the actual transmission ratio (actual through transmission ratio vRATIO) of the variator 20 to a transmission ratio value for shifting to normal control. The instantaneous interruption recovery control portion (FIG. 4) is further configured to, upon the power reset from the instantaneous interruption during the running, set a change speed of the target transmission ratio (target through transmission ratio vRATIO0) from the lowest transmission ratio value to the desired transmission ratio (desired through transmission ratio vDRATIO) to be higher than that under the normal control before the time at which the desired target transmission ratio (desired through transmission ratio vDRATIO) deviates from the lowest transmission ratio value.

It is therefore possible to, when the power is reset from the instantaneous interruption during the running, prevent the rotation of the running drive source (engine 1) from becoming high.

(2) The frictional engagement element (high clutch 33) is arranged in series with the variator 20 and brought into engagement after the lapse of predetermined time from the power set; and the instantaneous interruption recovery control portion (FIG. 4) is configured to set the change speed of the target transmission ratio (target through transmission ratio vRATIO0) such that the target transmission ratio (target through transmission ratio vRATIO0) is converged to the desired transmission ratio (vDRATIO) before the completion time (t8) of the engagement of the frictional engagement element (high clutch 33).

It is thus possible, by switching from the instantaneous interruption recovery control to the normal control at the time of transmission of the drive force, to reliably prevent the rotation of the running drive source (engine 1) from becoming unnecessarily high in addition to obtaining the above effect (1).

(3) The shift control unit (transmission controller 12) further includes: the shift time constant setting portion configured to set the shift time constant that determines the change speed of the target transmission ratio (target through transmission ratio vRATIO0). In this case, the instantaneous interruption recovery control portion (FIG. 4) is configured to switch the shift time constant set by the shift time constant setting portion (step S7) and thereby vary the change speed of the target transmission ratio (target through transmission ratio vRATIO0).

In addition to the above effects (1) and (2), it is thus possible to raise the change speed of the target transmission ratio (target through transmission ratio vRATIO0) from the lowest transmission ratio value to the desired transmission ratio (desired through transmission ratio vDRATIO) only with such a simple configuration for switching the shift time constant set by the shift time constant setting portion.

(4) The engine 1 is arranged as the running drive source; and the instantaneous interruption recovery control portion (FIG. 4) is configured to execute downshift restriction of the variator 20 during the instantaneous interruption recovery control after the power reset (steps S8 to S10).

In addition to the above effects (1) to (3), it is possible by the downshift restriction of the variator 20 to prevent the rotation of the engine 1 from becoming unnecessarily high even in the case where the engagement time of the frictional engagement element (high clutch 33) is earlier than intended.

(5) The instantaneous interruption recovery control portion (FIG. 4) is further configured to restrict downshift of the variator 20 (step S9) as much as possible when the engine rotation speed Ne is higher than or equal to the predetermined value.

It is thus possible to, in addition to the above effect (4), effectively prevent the rotation of the engine 1 from becoming unnecessarily high when the engine rotation speed Ne is higher than or equal to the predetermined value. In particular, it is possible by prohibiting the downshift of the variator 20 to reliably prevent the rotation of the engine 1 from becoming unnecessarily high.

(6) The instantaneous interruption recovery control portion (FIG. 4) is further configured to relieve the downshift restriction of the variator 20 (step S10) when the engine rotation speed Ne is lower than the predetermined value.

It is thus possible to, in addition to the above effect (5), avoid the occurrence of engine stall by relieving the downshift restriction, i.e., increasing the allowable amount of downshift when the engine rotation speed Ne is lower than the predetermined value as compared with the case where the engine rotation speed Ne is higher than or equal to the predetermined value.

Although the vehicular variator control device according to the present invention has been described above by reference to Embodiment 1, the present invention is not limited to the specific configurations of Embodiment 1. Various modifications and changes of the above embodiment are possible without departing from the scope of the present invention.

Upon the power reset from the instantaneous interruption during the running, the instantaneous interruption recovery control portion (FIG. 4) sets the change speed of the target through transmission ratio vRATIO0 higher at time t4 at which the judgment is made on the recovery from the instantaneous interruption on the basis of increase in vehicle speed sensor value in Embodiment 1. Alternatively, the instantaneous interruption recovery control portion may set the change speed of the target transmission ratio higher at the timing of the power reset or at any timing between the power reset and the deviation of the desired transmission ratio from the lowest target transmission ratio value. In other words, the change speed of the target transmission ratio can be set higher before the time at which the desired transmission ratio deviates from the lowest transmission ratio value.

Although the desired through transmission ratio vDRATIO is set by the desired transmission ratio setting portion according to the vehicle running speed VSP and the accelerator opening APO in Embodiment 1, the desired transmission ratio setting portion can set the desired transmission ratio of the variator 20 based on at least one of the "driver' operating action (such as accelerator opening or selector lever operation)" and "vehicle running state (such as vehicle running speed or steering angle)".

In Embodiment 1, the high clutch 33 is provided as the frictional engagement element in the sub-transmission mechanism 30 at a position downstream of the variator 20. It is alternatively feasible to adopt the low brake, which is engaged or disengaged before the power reset, as the frictional engagement element. The frictional engagement element may also alternatively be, for example, a forward clutch of a forward/reverse switching mechanism located at a position upstream of the variator 20.

Although the instantarious interruption recovery control portion (FIG. 4) returns the shift time constant to the normal setting upon switching from the instantarious interruption recovery control to the normal control in Embodiment 1, the instantarious interruption recovery control portion can alternatively set the shift time constant to any value according to the driving state upon switching from the instantarious interruption recovery control to the normal control.

In Embodiment 1, the vehicular variator control device according to the present invention is applied to the engine-driven vehicle having mounted thereon the continuously variable transmission with the sub-transmission mechanism. However, the vehicular variator control device according to the present invention is applicable to any other type of vehicle such as an electric vehicle having a motor generator as a running drive source or a hybrid vehicle having an engine and a motor generator as a running drive source. The vehicular variator control device according to the present invention is also applicable to a vehicle having mounted thereon a continuously variable transmission with a forward/reverse switching mechanism and a variator and without a sub-transmission mechanism.

The invention claimed is:

1. A vehicular variator control device for controlling a variator of a vehicle, the variator being arranged between a running drive source and drive wheels to continuously vary a transmission ratio, the control device comprising a shift control unit configured to control an actual transmission ratio of the variator to a target transmission ratio, the shift control unit comprising:

a desired transmission ratio setting portion configured to set a desired transmission ratio of the variator according to at least one of a driver's operating action and a running state of the vehicle; and a target transmission ratio setting portion configured to set the target transmission ratio so as to change the actual transmission ratio to the desired transmission ratio at a given shift speed, wherein the shift control unit further comprises an instantaneous interruption recovery control portion configured to, upon a power reset from an instantaneous interruption during running, set the target transmission ratio and the desired transmission ratio to a lowest transmission ratio value by initialization and perform recovery control to recover the actual transmission ratio of the variator to a transmission ratio value for shifting to normal control, and wherein the instantaneous interruption recovery control portion is further configured to, upon the power reset from the instantaneous interruption during the running, set a change speed of the target transmission ratio from the lowest transmission ratio value to the desired target transmission ratio to be higher than that under the normal control before a time at which the desired transmission ratio deviates from the lowest target transmission ratio value.

2. The vehicular variator control device according to claim 1, wherein the vehicle comprises a frictional engagement element arranged in series with the variator and brought into engagement after a lapse of predetermined time from the power reset, and wherein the instantaneous interruption recovery control portion is configured to set the change speed of the target transmission ratio such that the target transmission ratio is converged to the desired transmission ratio before completion of the engagement of the frictional engagement element.

3. The vehicular variator control device according to claim 1, wherein the shift control unit comprises a shift time constant setting portion configured to set a shift time constant that determines the change speed of the target transmission ratio, and wherein the instantaneous interruption recovery control portion is configured to switch the shift time constant set by the shift time constant setting portion and thereby vary the change speed of the target transmission ratio.

4. The vehicular variator control device according to claim 1, wherein the running drive source is an engine, and wherein the instantaneous interruption recovery control portion is configured to execute downshift restriction of the variator during the recovery control after the power reset.

5. The vehicular variator control device according to claim 4, wherein the instantaneous interruption recovery control portion is configured to restrict downshift of the variator as much as possible when a rotation speed of the engine is higher than or equal to a predetermined value.

6. The vehicular variator control device according to claim 5, wherein the instantaneous interruption recovery control portion is configured to, when the rotation speed of the engine is lower than the predetermined value, relieve the downshift restriction of the variator.

* * * * *